United States Patent [19]

Nussbaumer et al.

[11] Patent Number: 4,768,897
[45] Date of Patent: Sep. 6, 1988

[54] COVERING FOR WASTE DEPOSITORIES

[75] Inventors: Manfred Nussbaumer, Leonberg; Eberhard Gläser, Aichwald; Eberhard Beitinger, Stuttgart, all of Fed. Rep. of Germany

[73] Assignee: Ed. Z³blin Aktiengesellschaft, Stuttgart-Mohringen, Fed. Rep. of Germany

[21] Appl. No.: 805,821

[22] Filed: Dec. 6, 1985

[30] Foreign Application Priority Data

Dec. 8, 1984 [DE] Fed. Rep. of Germany ....... 3444895

[51] Int. Cl.⁴ ............................................. B09B 1/00
[52] U.S. Cl. ...................................... 405/128; 405/50
[58] Field of Search ................ 405/128, 129, 270, 43, 405/45, 52, 55, 17, 50

[56] References Cited

U.S. PATENT DOCUMENTS

| 1,401,386 | 12/1921 | Woodberry | 405/45 |
| 3,563,038 | 2/1971 | Hearly et al. | 405/45 |
| 4,166,709 | 9/1979 | Valiga | 405/128 |
| 4,194,855 | 3/1980 | Egger | 405/128 |
| 4,480,943 | 11/1984 | Levenberger | 405/17 |
| 4,483,641 | 11/1984 | Stoll | 405/129 |
| 4,572,700 | 2/1986 | Mantarro et al. | 405/45 |
| 4,580,925 | 4/1986 | Matich et al. | 405/128 |
| 4,622,138 | 11/1996 | Wager | 405/50 X |

FOREIGN PATENT DOCUMENTS

| 1188525 | 6/1985 | Canada | 405/129 |
| 2430371 | 6/1974 | Fed. Rep. of Germany | 405/128 |
| 3041706 | 5/1984 | Fed. Rep. of Germany | 405/128 |
| 3415729 | 9/1984 | Fed. Rep. of Germany | 405/128 |

Primary Examiner—David H. Corbin
Attorney, Agent, or Firm—Kenyon & Kenyon

[57] ABSTRACT

A multilayer plate for use in covering waste depositories comprises at least one drainage layer and a filter stabilization layer, the drainage layer serving to facilitate or enable the removal of water seeping downwardly from the surface of the depository covering or gases rising from the depository body. The filter stabilization layer comprises a fabric web, while the drainage layer includes a plastic grid. The plate is prefabricated and is of sufficient flexibility to be wound upon a roll for transport to a depository site. In one form, the prefabricated plate also includes a synthetic resin barrier layer which, upon installation of the plate, blocks the passage of water from above and the passage of gases from below.

33 Claims, 3 Drawing Sheets

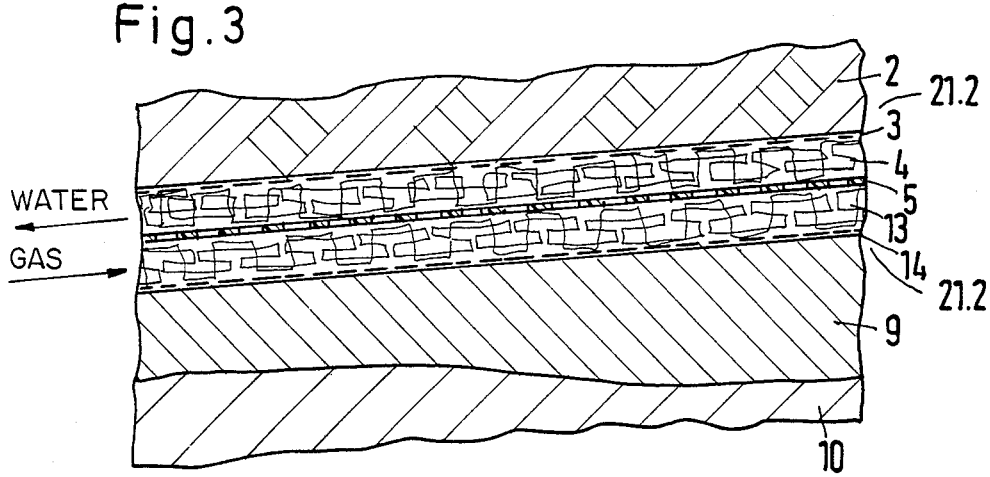
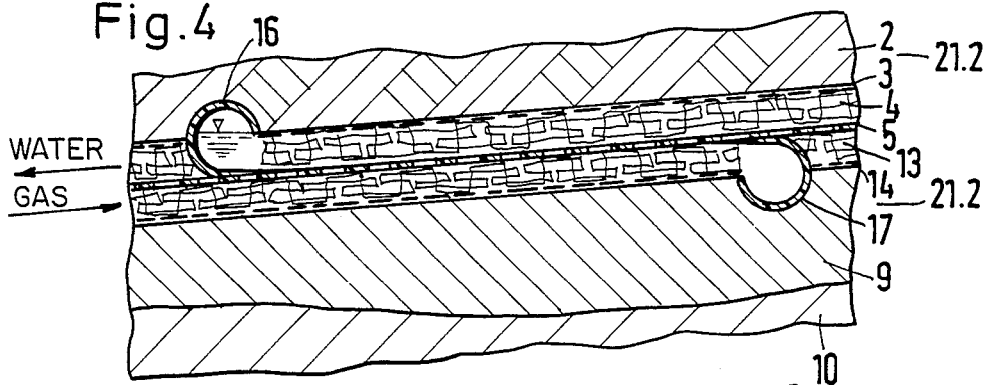
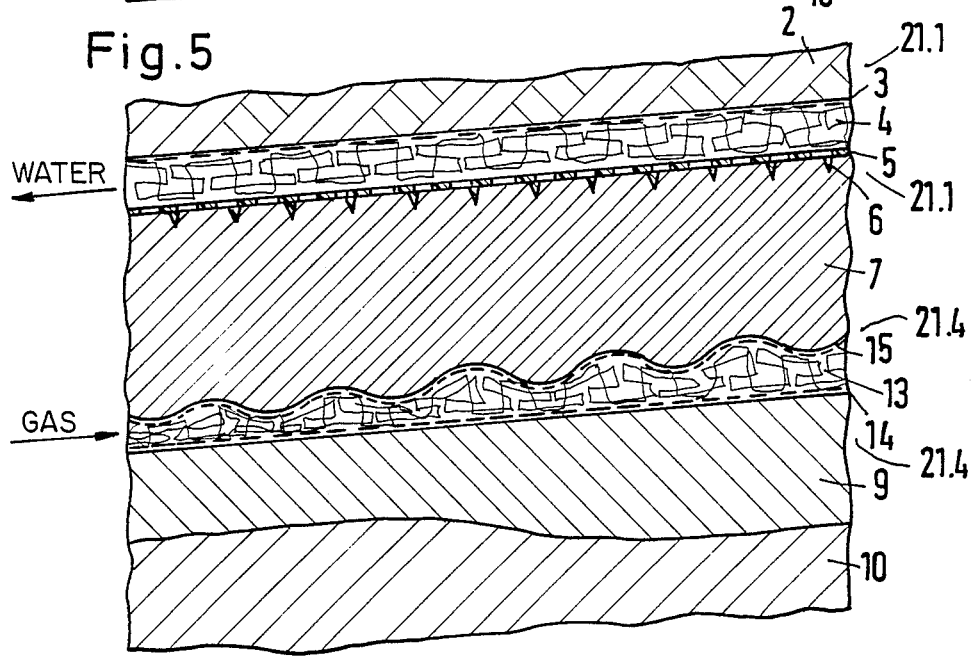

COVERING FOR WASTE DEPOSITORIES

BACKGROUND OF THE INVENTION

The invention relates to a device for covering depositories.

Covering depositories serves several purposes. The important ones are:

Providing a site for plants and animals in accordance with reforestation measures.

Preventing surface leakage water from penetrating into the depository body.

Preventing uncontrolled emissions from the depository body into the cover soil and into the atmosphere.

These tasks are essentially fulfilled by a basic layer structure of the depository cover comprising, from the top down: (a) humus, (b) root soil, (c) a substructure for draining surface leakage water, (d) a barrier layers, (e) degasification drainage structure, and, (f) an equalization layer.

The humus and the root soil are the base for a plant cover over the depositories, while the upper drainage structure serves for preventing backwater accummulations over the barrier layer which accumulations would interfere with the growth of plants. The barrier layer performs two functions: to prevent access of water into the depository body and to prevent the escape of gases from the depository body. Gases retained by the barrier layer are removed in a large-area gas drainage structure. The gas drainage is placed on an equalization layer disposed over the storage masses proper.

In known proposals for the layer structure, the substructure for draining surface leakage water consists of a gravel filter bed up to 50 cm thick with drainage pipes, the barrier layer is made of clay with thicknesses between 0.30 and 0.80 m and the gas drainage structure comprises a coarsegrain filter gravel layer with thicknesses of up to 0.50 cm and built-in gas collecting pipes. In such proposed depository covers the drainage and barrier layers reach a total thickness of between 1.00 to approximately 1.50 m. The costs for shipping and installation are correspondingly high. Each layer must be brought in individually with, in part, heavy equipment and must be densified.

Objects of the invention are to reduce the total thickness of the drainage and barrier layers in the above-described type of depository cover, to reduce the manufacturing and installation costs and to keep the required cost for installation equipment as well as the installation times as low as possible.

SUMMARY OF THE INVENTION

The invention proposes to make at least two of the drainage and barrier layers with sandwich-type plates which can be laid out in large areas and connected to each other, with small thicknesses totalling between approximately 5 and 10 cm. In addition, the sandwich plates are connected firmly to filter stabilization layers at the boundary surfaces to the root soil, the barrier layer and/or the equalization layer. To this end, three basic types of sandwich plates are proposed in accordance with the invention.

The first type of sandwich plate includes three layers, from the top down:
I-Filter stabilization layer;
II-Drainage layer/water;
III-Barrier layer.

The second type of sandwich plate includes five layers from top to bottom as follows:
I-Filter stabilization layer;
II-Drainage layer/water;
III-Barrier layer;
IV-Drainage layer/gas;
V-Filter stabilization layer.

The third type of sandwich plate also includes three layers:
I-Barrier layer;
II-Drainage layer/gas;
III-Filter stabilization layer.

In addition, combinations of the three basic structures of sandwich plates are possible. The substances removed in the drainage layes such as leakage water and depository gases can be picked up by collecting pipes and transported away for further disposal. The sandwich plates are preferably wound on rolls, laid out and connected to each other.

The second type sandwich plate, with the multiple-function of blocking and draining gas and water consists exemplarily of a filter fabric (thickness of approximately 0.1 to 1 cm), a plastic screen of HDPE (thickness of approximately 1 to 2 cm), an HDPE foil (thickness of approximately 2 to 5 mm), a plastic screen for gas drainage (thickness of approximately 1 to 2 cm) and a second filter fabric (thickness of approximately 0.1 to 1 cm). The total thickness of such multiple sandwich plate is between 5 and 10 cm. The plate is relatively flexible and light, reduces the otherwise required layer thickness by a factor of 10, can be laid out at one time, is easy to connect and substantially less expensive than corresponding prior proposed depository cover structures.

Figure 1:
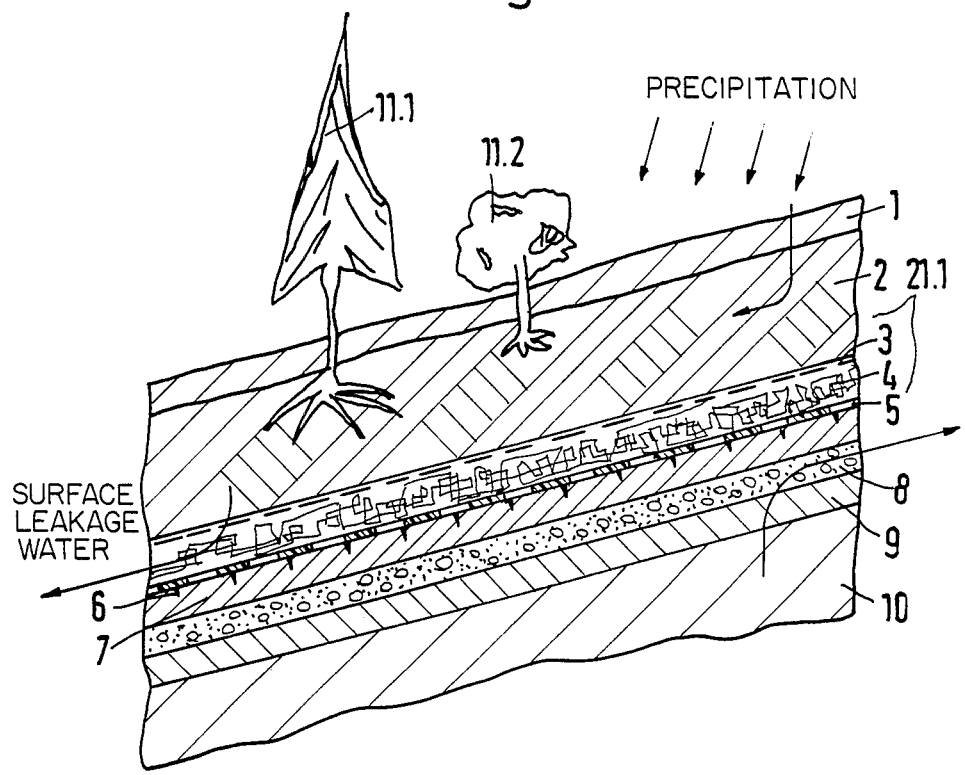
FIG. 1 is a schematic sectional view of a covering for a depository, showing a sandwich plate in accordance with the present invention.

FIG. is a sectional view, on an enlarged scale of the sandwich plate shown in FIG. 1.

FIG. 3 is a partial sectional view of a covering for a depository, showing another sandwich plate in accordance with the present invention.

FIG. 4 is a partial sectional view similar to FIG. 3, showing in addition a pair of drainage pipes.

Figure 2:
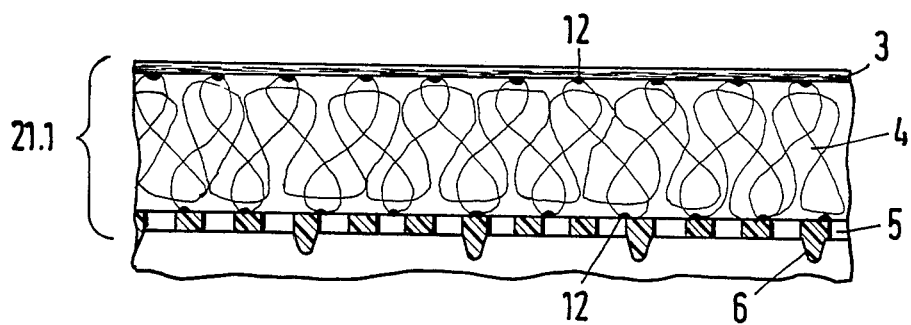

FIG. 5 is a partial sectional view of a depository covering including the plate of FIGS. 1 and 2 and yet another sandwich plate in accordance with the present invention.

Figure 6:
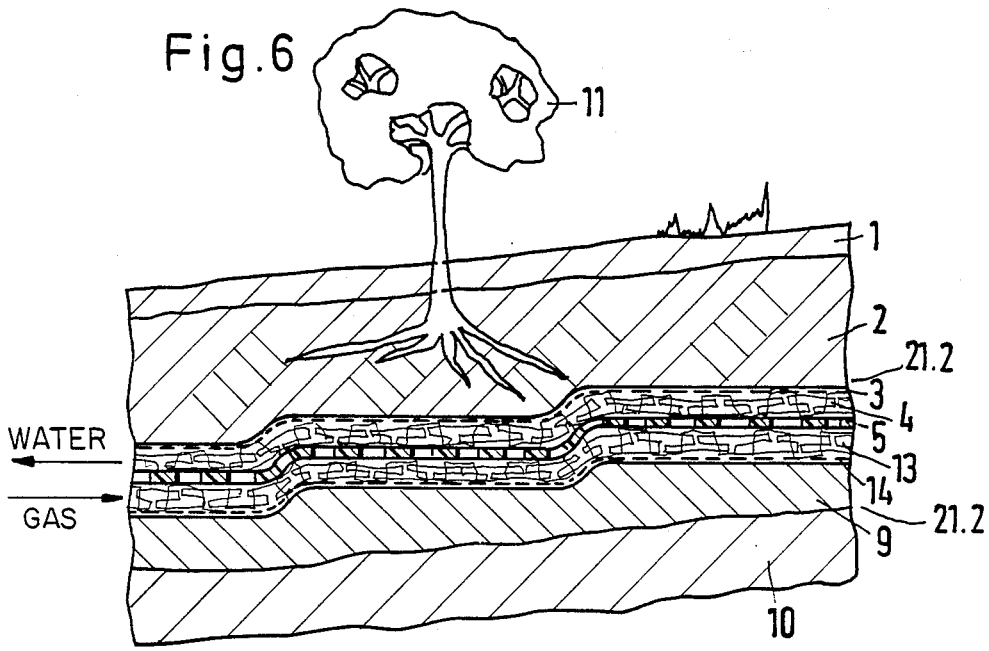

FIG. 6 is a schematic sectional view of a depository covering including the sandwich plate of FIGS. 3 and 4, showing a particular configuration of the plate in accordance with the present invention.

Figure 7:
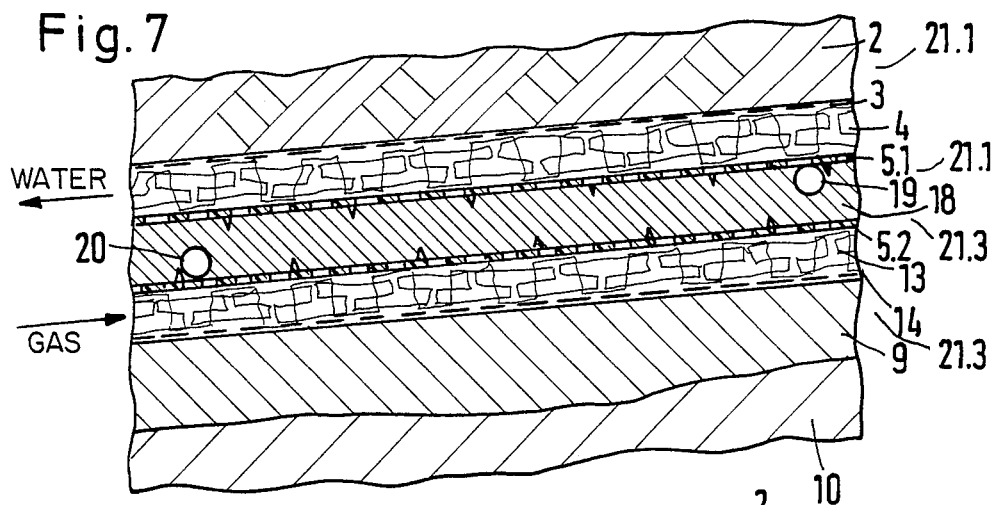

FIG. 7 is a partial sectional view of a depository covering including the sandwich plate of FIGS. 1 and 2 and yet another sandwich plate in accordance with the present invention.

Figure 8:
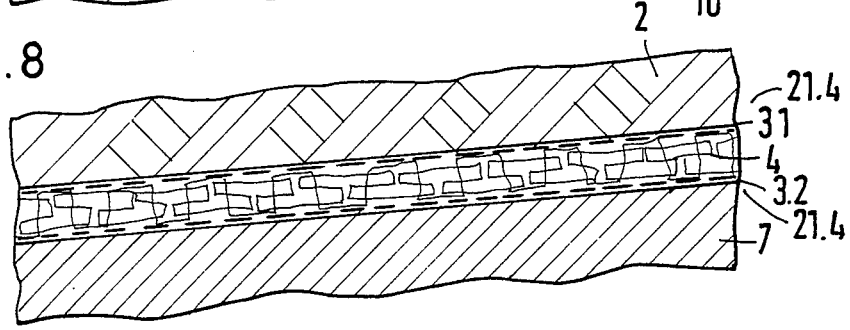

FIG. 8 is a partial sectional view of a covering for a depository showing a further sandwich plate in accordance with the present invention.

DETAILED DESCRIPTION

As shown in FIG. 1, a sandwich plate 21.1 is included in a covering for the surface of a depository body 10. From top to bottom, the covering comprises: a layer of humus 1, root soil 2, sandwich plate 21.1, a mineral seal 7, a drainage layer for degasification 8, and an equalization layer 9 over the depository body 10. As illustrated schematically in FIGS. 1 and 7, trees 11, 11.1 and 11.2 may be rooted in soil layer 2.

As illustrated in FIG. 2, sandwich plate 21.1 consists of a filter stabilization layer 3 such as a filter fabric, a drainage layer 4 having a permeable support structure formed exemplarily by a claw mat, and a barrier layer 5 preferably in the form of an impermeable plate with impressed humps 6 for anchoring the sandwich plate 21.1 to the mineral barrier layer 7 underneath. The three layers of the sandwich plate 21.1 are firmly connected to each other via cementing or welding spots 12. The leakage water which penetrates from the surface of the depository cover into the root soil is retained by the barrier layer 5 and removed in the drainage layer 4 thereabove. The filter stabilization layer 3 prevents fine soil particles from penetrating into the drainage layer 4 and thereby ensures the permeability of the drainage layer. The free cross section of the drainage layer 4 is kept open by the support structure in the form of a screen or a claw mat, against the pressure of the soil. The thickness of the drainage layer in the unloaded state must be so great that, after the loading has taken place, sufficient free cross section area is still available for removing the surface leakage water. The overall thickness of the sandwich plate 21.1 is advantageously between 2 and 5 cm. The materials of the sand are available plastics, particularly high-density polyethylene (HDPE). The sandwich plate 21.1 is so flexible that it can be shipped to a construction site wound on a roll and can be unwound there from the roll directly onto an installation area. The relative compressibility of the support structure of the drainage layer enables a bonding of the root soil layer to the sandwich plate 21.1 with the result that sliding on the contact surface is made more difficult.

All sandwich plates in accordance with the invention are flexible so that they can largely follow without destruction changes in the geometry of the depository surface, for example, due to settling.

A sandwich plate 21.2 shown in FIGS. 3 and 4 fulfills the functions of surface leakage water drainage 4, a barrier layer, and gas drainage. The sandwich plate 21.2 is structured from the top down as follows: filter stabilization layer 3, permeable support structure 4, barrier layer 5, a permeable support structure 13 and a filter stabilization layer 14. The thickness of the sandwich plate 21.2 is between 5 and 10 cm and replaces a thickness of 1.0 to 1.5 m in the conventional design of the water drainage, barrier and degasification layers. The sandwich plate 21.2 is flexible and is installed between the root soil 2 and the equalization layer 9 over the depository body 10.

For collecting and removing the surface leakage water and the depository gas, pipes 16 and 17 can be integrated into any of the sandwich plates in accordance with the invention, as shown in FIG. 4. Such collecting pipes 16 and 17 can also be connected externally to the drainage layers. Their arrangement and their dimensions must be designed according to the amount of leakage water and gas produced.

In FIG. 5, a combination of two sandwich plates 21.1 and 21.4 are shown for covering the surface of the depository body 10. Between the root soil 2 and a middle clay barrier layer 7, the sandwich plate 21.1 is built-in for surface leakage water drainage, and between the fine subgrade 9 and the clay barrier 7, the sandwich plate 21.4, which comprises two filter stabilization layers 14 and 15 and between them, the drainage layer 13 for gas removal.

As illustrated in FIG. 6, to avoid the development of inclined slide surfaces along the sandwich plate boundary surfaces, the equalization layer 9 is designed in stair-fashion and the sandwich plate 21.2 is installed thereon.

Another configuration of a surface covering with a sandwich plate in accordance with the invention is shown in FIG. 7. For removing leakage water, the sandwich plate 21.1 is arranged below the root soil 2. For removing the depository gas, a sandwich pate 21.3 is installed on the equalization layer the sandwich plate 21.3 comprising from the top down, a barrier layer 5.2, gas drainage layer 13, and filter stabilization layer 14. For controlling the impermeability of the barrier layers 5.1 and 5.2, a permeable layer 18 is disposed between the two barrier layers 5.1 and 5.2. Penetrating liquids or gases can then be removed in quantity from the permeable layer 18 via control pipes 19 and 20. It is also possible to install between the two sandwich plates 21.1 and 21.3 a further barrier layer with a mineral base (not shown) instead of the permeable layer 18.

FIG. 8 shows a further possible embodiment of the surface leakage water drainage with the sandwich plate 21.4 which consists of the following layers: filter stabilization layer 3.1, surface leakage water draining 4, filter stabilization layer 3.2. The sandwich plate 21.4 must be installed in this case on a preferably mineral barrier layer 7.

What is claimed is:

1. A device for use in covering a waste depository, said device comprising an integral flexible prefabricated plate including first means essentially in the form of a unitary drainage layer for enabling the removal of a collecting fluidic material, said plate further including second means essentially in the form of a unitary filter stabilization layer essentially permanently attached to said drainage layer and superimposed upon said drainage layer for preventing soil particles from entering said drainage layer, said plate further including third means essentially in the form of a unitary barrier layer superimposed upon said drainage layer and essentially permanently attached to said drainage layer on a side thereof opposite said filter stabilization layer for preventing passage of fluidic material in a direction transverse to a plane defined by said plate, said drainage layer further including means for maintaining a fluid flow path between said filter stabilization layer and said barrier layer under the effect of forces directed substantially transverse to a plane of said plate and, said barrier layer further including means for anchoring said plate to an adjoining layer covering a depository body.

2. The device recited in claim 1 wherein said plate is sufficiently flexible to be wound upon a roll for transport to a depository site.

3. The device recited in claim 1 wherein said drainage layer is adapted for the removal of liquid.

4. The device recited in claim 1 wherein said drainage layer is adapted for the removal of gas.

5. The device recited in claim 1 wherein said filter stabilization layer includes a fabric web.

6. The device recited in claim 1 wherein said plate has edges connectable to edges of other similar plates for covering a large area.

7. The device recited in claim 1 wherein said plate further includes fourth means essentially in the form of a degasification layer attached to said barrier layer on a side thereof opposite said drainage layer for enabling the removal of gases generated by a depository body, said plate further including fifth means essentially in the form of an additional filter stabilization layer attached to said degasification layer on a side thereof opposite said barrier layer for preventing entry of soil particles into said degasification layer.

8. The device recited in claim 1 wherein said barrier layer is a plastic foil.

9. A covering for a waste depository, comprising:
a humus layer;
a root soil layer under said humus layer;
first means including a drainage layer under said root soil layer for enabling the removal of water seeping through said humus layer and said root soil layer;
second means including a barrier layer under said drainage layer for preventing passage of water from above and gases from below;
fourth means including a degasification layer under said barrier layer for enabling the removal of gases generated in a depository body disposed below said degasification layer; and
an equalization layer disposed between said degasification layer and the depository body, at least one of said drainage layer and said degasification layer being a unitary layer formed as part of an integral prefabricated plate, said plate further including a unitary filter stabilization layer essentially permanently attached to said one of said drainage layer and said degasification layer for preventing soil particles from entering said one of said drainage layer and said degasification layer from an adjacent layer.

10. The covering recited in claim 1 wherein said plate includes said drainage layer and further includes said barrier layer attached to a side of said drainage layer opposite said filter stabilization layer.

11. The covering recited in claim 10 further comprising an additional barrier layer of mineral sealants disposed between said plate and said degasification layer.

12. The covering recited in claim 10, further comprising an additional prefabricated plate including said degasification layer and an additional filter stabilization layer attached to said degasification layer and said equalization layer, further comprising an additional barrier layer forming part of said additional prefabricated plate and attached to said degasification layer on a side thereof opposite said additional filter stabilization layer, further comprising a permeable intermediate layer of mineral bulk material disposed between the plates.

13. The covering recited in claim 10 wherein said degasification layer forms a part of said plate and is attached to said barrier layer on a side thereof opposite said drainage layer, further comprising an additional filter stabilization layer attached to said degasification layer on a side thereof opposite said barrier layer, said additional filter stabilization layer being disposed between said degasification layer and said equalization layer.

14. The covering recited in claim 9 wherein said plate includes said degasification layer and further includes said barrier layer attached to a side of said degasification layer opposite said filter stabilization layer.

15. The covering recited in claim 14 further comprising an additional barrier layer in the form of a mineral layer disposed between said drainage layer and said plate.

16. The covering recited in claim 9 wherein said plate includes said degasification layer and said filter stabilization layer constitutes a first filter stabilization layer attached to one side of said degasification layer, said plate further including a second filter stabilization layer attached to said degasification layer on a side thereof opposite said first filter stabilization layer.

17. The covering recited in claim 16 wherein said plate is disposed between said barrier layer and said equalization layer, said barrier layer taking the form of a mineral layer.

18. The covering recited in claim 9 wherein said filter stabilization layer is a fabric web.

19. The covering recited in claim 9 wherein said one of said drainage layer and said degasification layer includes a permeable support structure.

20. The covering recited in claim 19 wherein said support structure has a thickness between 0.5 and 5 cm.

21. The covering recited in claim 19 wherein said support structure is a grid.

22. The covering recited in claim 19 wherein said support structure is a claw mat.

23. The covering recited in claim 19 wherein said support structure consists of a synthetic resin material.

24. The covering recited in claim 9 wherein individual layers of said plate are cemented to each other.

25. The covering recited in claim 9 wherein individual layers of said plate are welded to each other.

26. The covering recited in claim 9 wherein said barrier layer is a layer of said plate and takes the form of a synthetic resin foil.

27. The covering recited in claim 26 wherein said foil is made of polyethylene.

28. The covering recited in claim 9 wherein said barrier layer is a layer of said plate and is provided with means for anchoring said plate to an adjoining layer in the covering.

29. The covering recited in claim 9 wherein collecting tubes are provided in said drainage layer and said degasification layer for receiving and transporting leakage water and gases away from said drainage layer and said degasification layer, respectively.

30. A method for producing a covering for a waste depository, wherein said covering comprises:
a humus layer;
a root soil layer under said humus layer;
first means including a drainage layer under said root soil layer for enabling the removal of water seeping through said humus layer and said root soil layer;
second means including a barrier layer under said drainage layer for preventing passage of water from above and gases from below;
fourth means including a degasification layer under said barrier layer for enabling the removal of gases generated in a depository body disposed below said degasification layer; and
an equalization layer disposed between said degasification layer and the depository body;
said method comprising the steps of:
depositing at least one of the layers of the covering, beginning with said equalization layer, over the depository body;
unwinding from a roll an integral flexible prefabricated plate including a unitary layer in the form of at least one of said drainage layer and said degasification layer and further including a unitary filter stabilization layer essentially permanently attached to said one of said drainage layer and said degasification layer;

laying said plate over the layers deposited over said waste depository in said step of depositing; and forming remaining layers of the covering in order above said plate.

31. The method recited in claim 30, further comprising the step of connecting said plate along edges thereof to other plates having the same layer structure.

32. The method recited in claim 30, wherein said barrier layer forms a layer of said plate and is made of synthetic resin material.

33. The method recited in claim 30 wherein said plate is laid in a step-like formation.

* * * * *